United States Patent [19]

Keats

[11] Patent Number: 4,639,882
[45] Date of Patent: Jan. 27, 1987

[54] MONITORING SYSTEM

[75] Inventor: Albert B. Keats, Dorchester, England

[73] Assignee: United Kingdom Atomic Energy Authority, London, England

[21] Appl. No.: 621,720

[22] Filed: Jun. 18, 1984

[30] Foreign Application Priority Data

Jun. 24, 1983 [GB] United Kingdom ............... 8317224

[51] Int. Cl.$^4$ .......................... H04J 3/14; G01K 7/02
[52] U.S. Cl. .................................. 364/550; 364/557; 374/167
[58] Field of Search ............... 364/550, 537, 579, 580; 374/101, 110, 141, 166, 167

[56] References Cited

U.S. PATENT DOCUMENTS

| 3,982,110 | 9/1976 | Kawai | 374/167 X |
| 4,114,442 | 9/1978 | Pratt | 374/167 X |
| 4,122,719 | 10/1978 | Carlson et al. | 374/167 |
| 4,324,138 | 4/1982 | Davis et al. | 374/167 X |
| 4,340,935 | 7/1982 | Analauf et al. | 364/580 X |
| 4,399,515 | 8/1983 | Gross | 364/557 X |
| 4,418,392 | 11/1983 | Hata | 364/557 X |
| 4,440,509 | 8/1984 | Agarwal | 374/166 |
| 4,480,312 | 10/1984 | Wingate | 364/557 |
| 4,483,631 | 11/1984 | Kydd | 364/557 X |
| 4,532,601 | 7/1985 | Lenderking et al. | 364/557 X |

Primary Examiner—Edward J. Wise
Attorney, Agent, or Firm—William R. Hinds

[57] ABSTRACT

A system for monitoring data signals representing a number of parameters of a plant or apparatus, periodically superimposes test signals on to some of the data signals so as to produce combined signals representing unacceptable states of the parameters. The selection of the data signals on which the test signals are superimposed is changed at each periodic examination in a predetermined sequence, so that a pattern of acceptable and unacceptable signals is produced as an output to be compared with a reference pattern.

13 Claims, 3 Drawing Figures

MONITORING SYSTEM

This invention relates to monitoring systems for, and a method of monitoring, industrial process plants or apparatus, and one application of the invention is in nuclear reactors for the detection of fault conditions.

A monitoring system is described in UK Pat. No. 2 063 021B (U.S. Pat. No. 4,422,140, French Pat. Appln. No. 80 19664) in which data signals, originating from thermocouples, are supplied sequentially to a data processor by a multiplexer. To guard against failure of the multiplexer, some of the inputs to the multiplexer are wired to sources of test signals, rather than data signals; the test signals are equivalent to unacceptable data signals. The inputs to which the test signals sources are connected are chosen to produce a pattern of acceptable and unacceptable signals, which pattern can be recognised. The pattern should be the same for each scan of the entire set of input signals, and will change only if a data signal reaches an unacceptable value. Since the test signals sources are permanently wired to multiplexer inputs, those inputs cannot be used for data signals. Furthermore malfunctioning between the thermocouple and the multiplexer input may not be detected.

According to a first aspect of the present invention there is provided a system for monitoring a plurality of data signals from a plant or apparatus, each data signal representing a parameter of the plant or apparatus, the system comprising, means for periodically examining the data signals and for providing output signals representing whether each data signal represents an acceptable or an unacceptable state of the respective parameter, and means for supplying test signals to be superimposed on selected said data signals before each periodic examination thereof such as to produce corresponding combined signals equivalent to data signals representing the unacceptable state, the selection of the data signals on which the test signals are superimposed being changed for each periodic examination of the data signals within a predetermined sequence so that the examining means produces a recognisable pattern of said output signals.

The test signal supply means may include signal generating means, and the signal generating means may be linked to the examining means so as to control the test signal means in relation to a memory of past data signals.

A timing means may control the examining means and/or the test signal supply means, and the pattern of output signals may be compared in a pattern recognition means with a reference pattern.

In one application of the first aspect of the invention, a number of the monitoring systems are arranged in parallel for monitoring the same number of data signals representing each parameter, such that each said data signal is monitored by a respective monitoring system, each monitoring system being arranged to provide the pattern of output signals thereof to voting means, the voting means being arranged to supply an output to a said pattern recognition means.

Preferably, a plurality of said voting means are provided, each monitoring system being arranged to provide the pattern of output signals thereof to each said voting means.

In another aspect, the invention provides a method of monitoring a plurality of data signals from a plant or apparatus, each data signal representing a parameter of the plant or apparatus, the method comprising periodically examining each data signal and providing an output signal representing whether the data signal represents an acceptable or an unacceptable state of the respective parameter, and superimposing test signals on selected said data signals before each periodic examination thereof such as to produce corresponding combined signals equivalent to data signals representing the unacceptable state, the selection of the data signals on which the test signals are superimposed being changed within a predetermined sequence so that a recognisable pattern of the output signals is produced.

One advantage of the monitoring system of the invention is that it continually monitors its own operation and can provide a control signal indicating a fault if one of the parameters is in reality in an unacceptable state, or if the monitoring system is itself faulty, since in either case the correct pattern will not be present.

The invention will now be further described by way of example only and with reference to the accompanying drawings, in which.

Figure 1:
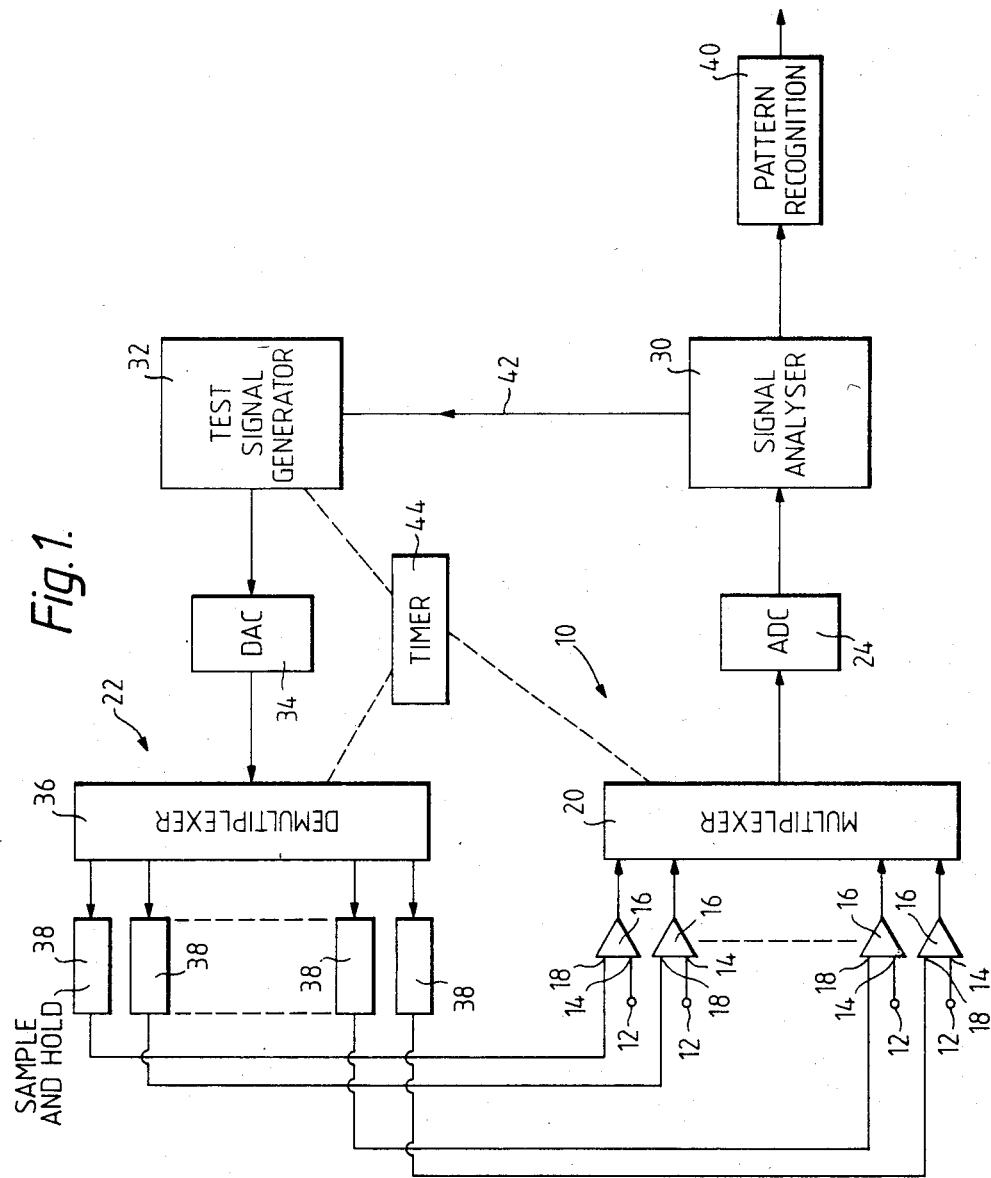
FIG. 1 shows a block diagram of a monitoring system.

Referring to FIG. 1, a monitoring system 10 for monitoring temperatures at thirty-two locations in a core of a nuclear reactor (not shown) has thirty-two input terminals 12 (only four are shown) to which loads carrying data signals from thirty-two temperature sensors (not shown) are connected. Each input terminal 12 is connected to one input 14 of a respective two-input, signal adding-and-amplifying unit 16 (only four are shown), the other input 18 of which is connected to a test signal generating system 22. The output of each unit 16 is connected to a respective input of a thirty-two input multiplexer 20, whose output is connected through an analogue-to-digital converter 24 to a signal analyser 30 arranged to provide an input to a pattern recognition unit 40.

In operation of the monitoring system 10, the multiplexer 20 scans sequentially the signals it receives, which, in the absence of signals from the test signal generating system 22, will correspond to the data signals representing the temperatures of the temperature sensors connected to the input terminals 12. At the end of each scan the polarity of the output from the multiplexer 20 is reversed, and the signal analyser 30 identifies this polarity change as signifying the beginning of a new scan. The signal received by the signal analyser 30 hence consists of a sequence of signals in digital form, each representing the temperature of one of the temperature sensors. The signal analyser 30 is a computer which, from the signal from each sensor:

(a) calculates the corresponding temperature;

(b) determines whether the temperature lies within predetermined acceptable limits;

(c) calculates the rate of change of temperature, from the calculated temperature and a memory of the previously calculated temperature;

(d) determines whether the rate of change of temperature of that sensor lies within predetermined acceptable limits;

(e) updates the memory of the temperature of that sensor if both the temperature and the rate of change of temperature lie within the respective limits; and (f) gives an output signal "1" if both the temperature and the rate of change of temperature are acceptable, or an output signal "0" if either the temperature or the rate of change of temperature are unacceptable.

Hence, in the absence of signals from the test signal generating system 22, if the nuclear reactor is operating normally the expected output signal produced by the signal analyser 30 is the sequence 1, 1, 1, 1, 1 ... etc., and this pattern of digits would be supplied as the input to the pattern recognition unit 40. It will be appreciated that the acceptable limits for temperature and for rate of change of temperature may well be different for sensors at different locations within the nuclear reactor. Hence the signal analyser 30 must be programmed with the acceptable limits for each sensor.

The test signal generating system 22 consists of a test signal generator 32 for producing a sequence of signals in digital form, and connected by a data link 42 to the signal analyser 30 for receiving the memory of the current values of the temperatures of the sensors. The test signal generator 32 is connected through a digital-to-analogue converter 34 to the input of a thirty-two output demultiplexer 36, the outputs of which are connected through respective sample-and-hold amplifiers 38 (only four of which are shown) to the inputs 18 of the units 16, each amplifier 38 being adapted to generate a steady signal corresponding to the most recent signal received from the demultiplexer 36 until the next signal from the demultiplexer 36 is received.

Thus when the test signal generating system 22 is in operation, the signals produced by the test signal generator 32 are superimposed in analogue form on the data signals from the sensors by the signal adding-and-amplifying units 16. Some of the signals produced by the test signal generator 32 and referred to as test signals, are such as to cause the multiplexer 20 and hence the signal analyser 30 to receive a signal representing a temperature outside the acceptable limits, or representing a temperature corresponding to an unacceptable rate of change of temperature, while other signals from the test signal generator 32 have no such effect on the respective data signals. The test signal generator 32 is programmed to calculate suitable values of test signals, utilising where necessary the temperature values received from the signal analyser 30 via the data link 42, so as to result in a desired test pattern of acceptable and unacceptable signals, i.e. to produce a desired sequence of "0" and "1" output signals from the signal analyser 30. The presence of the desired pattern is then detected by the pattern recognition unit 40.

It is clearly important for the test signal generator 32 and the demultiplexer 36 to operate in phase, so that the test signals are supplied to the appropriate sample-and-hold amplifiers 38, and this is ensured by the use of timing signals provided by a timer 44. Timing signals from the timer 44 also control the multiplexer 20 so that the multiplexer 20 performs one scan of the inputs it receives for every scan of the demultiplexer 36.

Figure 2:
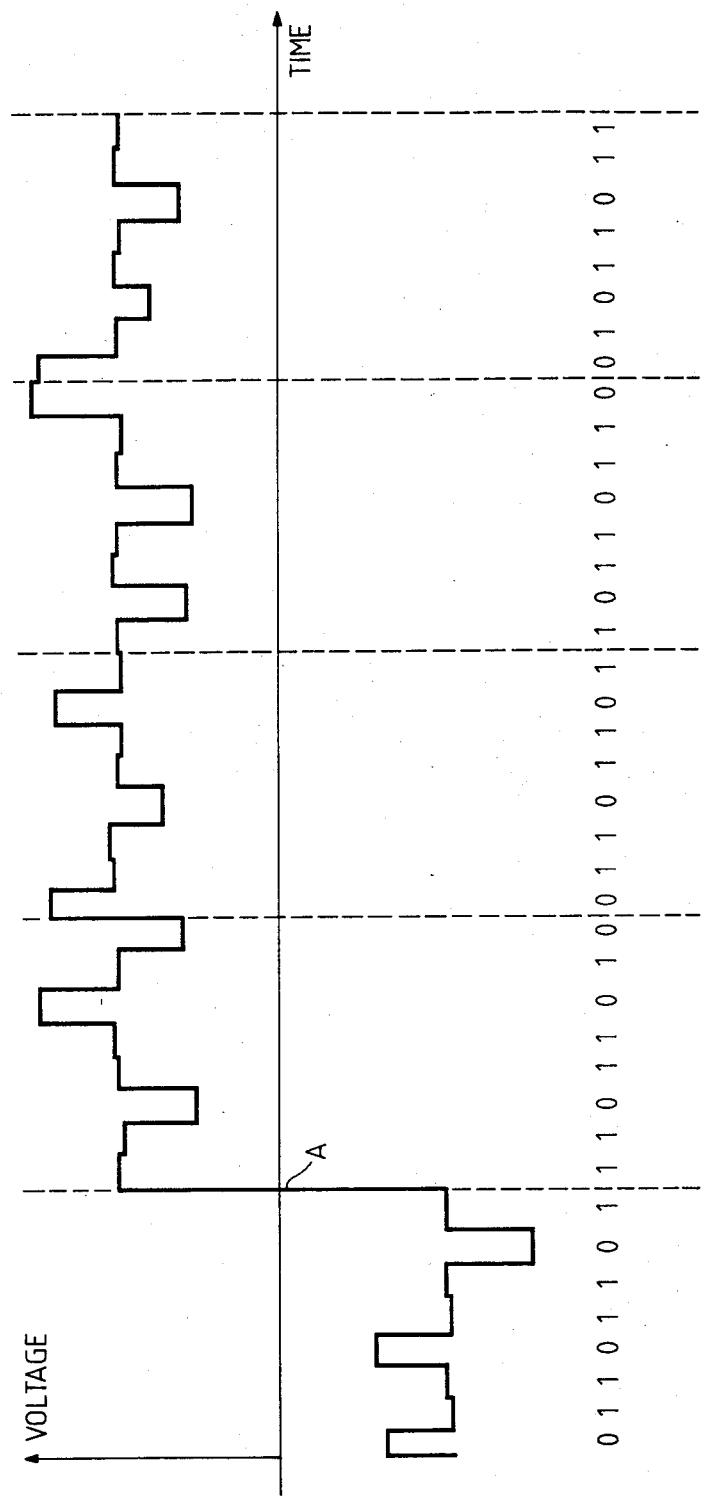
FIG. 2 represents electrical signals at two points in the monitoring system of FIG. 1.

An example of the variation of voltage with time at the output of the multiplexer 20 is shown in the graph of FIG. 2, in which the change of polarity occurring at time A signifies the start of a scan by the multiplexer 20 of the signals received at its thirty-two inputs. Below the graph are digits representing the corresponding output signals from the signal analyser 30. The graph of FIG. 2 and the corresponding digits are produced when the data signals from the sensors are in reality all at acceptable values, each "0" signifying the presence of a test signal superimposed on the respective data signal (an unacceptable value), and each "1" signifying a data signal unaffected by a signal from the test signal generating system 22 (an acceptable value).

The overall pattern of test signals is produced in four scans of the multiplexer 20, the test signals being applied to the inputs 18 of a different selection of adding and amplifying units 16 on successive scans of the multiplexer 20.

The sequence of output signals from the signal analyser 30 is shown in Table 1.

TABLE 1

| 1st Scan | 2nd Scan | 3rd Scan | 4th Scan |
|---|---|---|---|
| 1 | 1 | 1 | 1 |
| 1 | 0 | 1 | 0 |
| 0 | 1 | 0 | 1 |
| 1 | 0 | 1 | 0 |
| 1 | 1 | 1 | 1 |
| 0 | 1 | 0 | 1 |
| 1 | 0 | 1 | 0 |
| 0 | 1 | 0 | 1 |
| 0 | 1 | 1 | 0 |
| 1 | 1 | 0 | 1 |
| 1 | 0 | 1 | 0 |
| 0 | 1 | 1 | 1 |
| 1 | 0 | 0 | 1 |
| 1 | 1 | 1 | 0 |
| 0 | 1 | 0 | 1 |
| 1 | 0 | 1 | 1 |
| 1 | 0 | 0 | 1 |
| 0 | 1 | 1 | 0 |
| 1 | 1 | 1 | 1 |
| 1 | 0 | 0 | 1 |
| 0 | 1 | 1 | 0 |
| 1 | 0 | 0 | 1 |
| 1 | 1 | 1 | 1 |
| 0 | 1 | 1 | 0 |
| 0 | 1 | 1 | 0 |
| 1 | 0 | 1 | 1 |
| 0 | 1 | 0 | 1 |
| 1 | 1 | 1 | 0 |
| 1 | 0 | 0 | 1 |
| 0 | 1 | 1 | 1 |
| 1 | 0 | 1 | 0 |
| 1 | 1 | 0 | 1 |

It will be observed that with this test pattern, twenty inputs are tested twice, eight inputs are tested once, and four inputs are not tested at all. The structure of the test pattern of Table 1 is shown more clearly in Table 2, in which successive groups of eight successive digits are arranged in horizontal rows, commencing at the first eight digits of the first scan.

TABLE 2

| 1 | 1 | 0 | 1 | 1 | 0 | 1 | 0 |
|---|---|---|---|---|---|---|---|
| 0 | 1 | 1 | 0 | 1 | 1 | 0 | 1 |
| 1 | 0 | 1 | 1 | 0 | 1 | 1 | 0 |
| 0 | 1 | 0 | 1 | 1 | 0 | 1 | 1 |
| 1 | 0 | 1 | 0 | 1 | 1 | 0 | 1 |
| 1 | 1 | 0 | 1 | 0 | 1 | 1 | 0 |
| 0 | 1 | 1 | 0 | 1 | 0 | 1 | 1 |
| 1 | 0 | 1 | 1 | 0 | 1 | 0 | 1 |
| 1 | 1 | 0 | 1 | 1 | 0 | 1 | 0 |
| 1 | 0 | 1 | 1 | 0 | 1 | 0 | 1 |
| 0 | 1 | 1 | 0 | 1 | 0 | 1 | 1 |
| 1 | 1 | 0 | 1 | 0 | 1 | 1 | 0 |
| 1 | 0 | 1 | 0 | 1 | 1 | 0 | 1 |
| 0 | 1 | 0 | 1 | 1 | 0 | 1 | 1 |
| 1 | 0 | 1 | 1 | 0 | 1 | 1 | 0 |
| 0 | 1 | 1 | 0 | 1 | 1 | 0 | 1 |

The pattern of Table 2 may be generated by starting with the eight digits in the first row of Table 2, successive groups of eight digits being generated by sequentially shifting one place at a time eight places to the right and then eight places to the left, at each shift the digit at one end being moved to the other end of the group. It will also be observed that the pattern within any group of eight successive digits is asymmetrical, and also that the complete pattern cannot be reproduced by repetition of a portion of the complete pattern. These properties ensure that the pattern can only be reproduced if the multiplexer 20 scans all its inputs in the correct sequence. Consequently any fault in the operation of the multiplexer 20 will produce a different pattern.

It will be appreciated that this is but one of many possible test patterns which the test signal generator 32 may be programmed to generate and which the pattern recognition unit 40 can recognise. Where it is advantageous to test every input, an alternative test pattern may be generated in the manner described above by starting with the eight digits 10110100.

The pattern recognition unit 40, which receives the sequence of digits shown in Table 1, comprises a shift register and a comparator, the shift register storing a reference pattern consisting initially of the sequence of digits shown in the first row of Table 2. The sequence of digits received from the signal analyser 30 is compared, eight digits at a time, with the reference pattern in the shift register. The next eight digits are then compared with the same reference pattern (which should give a mismatch), and then the reference pattern is shifted by one place and the comparison repeated. The output of the comparator is "0" for a mismatch and "1" for a match, and should therefore consist of an alternating sequence 1 0 1 0 1 0 . . . etc. as long as the pattern is as shown in Table 1. If a match is not found after the reference pattern is shifted, then the shift-register will not shift the reference pattern again, and the next group of eight digits will not be admitted to the comparator, and so the output signal will no longer alternate. The pattern recognition unit 40 may be reset by manually depressing a reset button (not shown), subsequent groups of eight digits then being admitted to the comparator until a match is found, and the alternating output sequence then resuming.

It will be appreciated that faulty operation of the pattern recognition unit 40 can also be expected to produce a non-alternating output.

The output signal from the pattern recognition unit 40 may be used as a control signal for the nuclear reactor, the alternating sequence 1, 0, 1, 0, etc. signifying the detection of no faults, and a non-alternating sequence signifying:

(a) an unacceptable value of the temperature or of the rate of change of temperature of the sensors, or (b) a hardware fault anywhere in the monitoring system 10, or (c) a software fault in the test signal generator 32 or the signal analyser 30.

The monitoring system 10 thus continually checks values of temperature and rate of change of temperature in the reactor, and continually checks its own hardware and software, and it can be expected to fail-safe if any faults do occur. If it is not required to check values of rate of change of temperature but only values of temperature, then the signal analyser 30 need not maintain a memory of the values of the temperatures of the sensors, and the data link 42 can be dispensed with.

If it is important to minimise the chance of software or hardware faults causing control signals which indicate an unacceptable value of temperature and consequently trigger an unnecessary alarm, then a monitoring system similar to that of FIG. 1 may be provided with replication (and hence redundancy) of its components.

Figure 3:
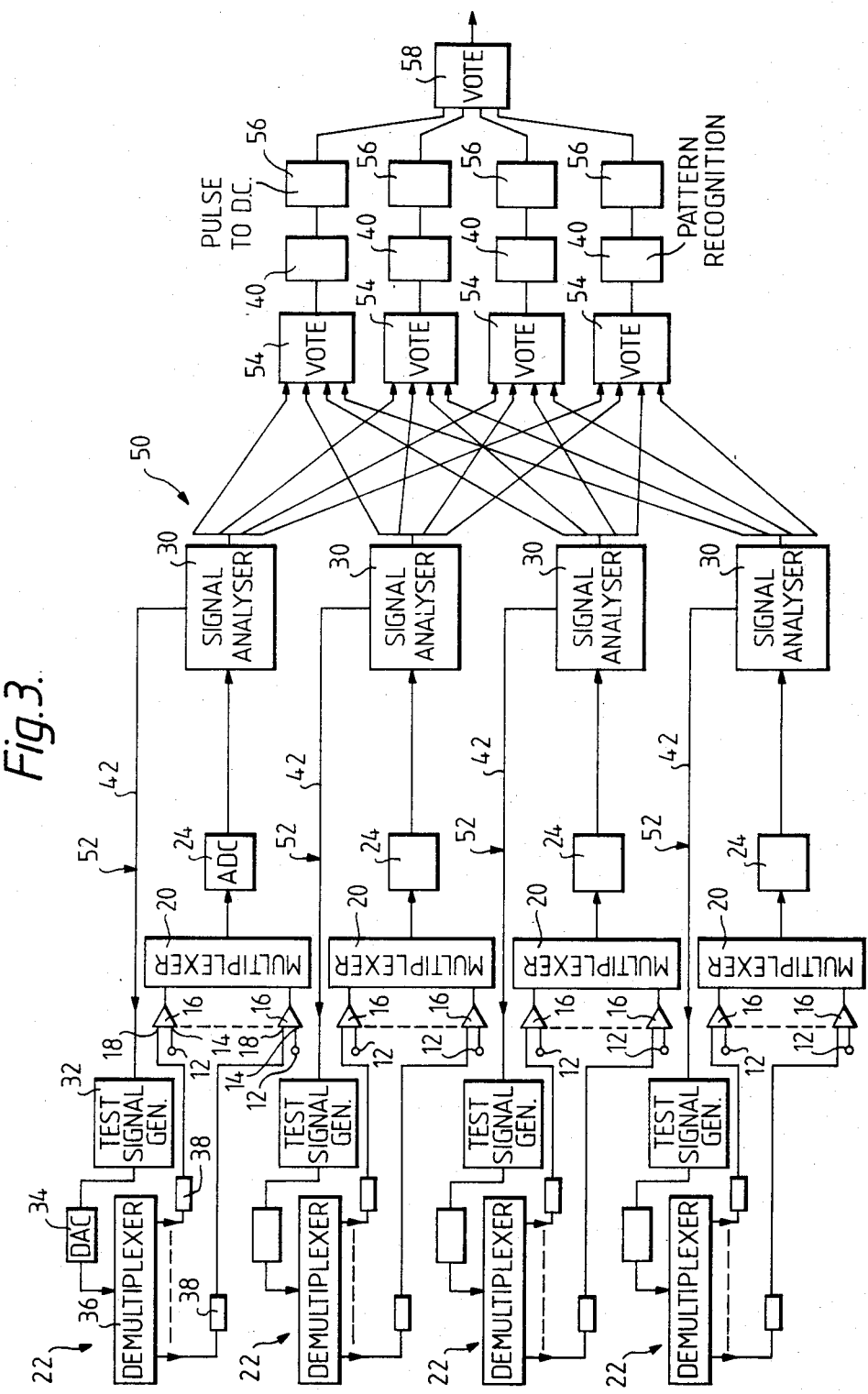
FIG. 3 shows a block diagram of an alternative monitoring system to that of FIG. 1.

In FIG. 3, to which reference is now made, is shown a monitoring system 50 for a nuclear reactor (not shown), similar in many respects to the monitoring system 10 of FIG. 1, identical components being referred to by the same reference numerals. The monitoring system 50 includes four identical independent sub-systems 52, each sub-system 52 differing from the monitoring system 10 only in not including a pattern recognition unit 40. Thus each sub-system 52 includes a test signal generating system 22, a multiplexer 20, and a signal analyser 30, and has thirty-two input terminals 12 (only two are shown for each sub-system 52) to which leads carrying data signals from sensors (not shown) measuring a variety of physical parameters are connected. Each sub-system 52 includes a timer 44 (not shown), the timers 44 being independent of each other and not synchronised.

The output from each signal analyser 30 is connected to four inputs of four identical four-input vote units 54, so that each vote unit 54 receives one input from each signal analyser 30. Each vote unit 54 is a computer programmed to store the sequence of digits received at each of its inputs, and initially to look for the first sixteen digit sequence of an expected pattern so as to synchronise the sequences of digits from the sub-systems 52. Once the sequences of digits are synchronised, then each subsequent digit is voted on, the vote unit 54 giving an output signal the same as the majority of the input signals received. The outputs of the vote units 54 are connected to respective pattern recognition units 40, whose outputs are connected through respective pulse-to-d.c. converters 56 to a common vote unit 58.

Each physical parameter relating to operation of the nuclear reactor is measured by four identical sensors each connected to an equivalent input terminal 12 of a respective one of the four sub-systems 52.

Each sub-system 52 operates in the same manner as the monitoring system 10 of FIG. 1, the test signal generator 32 generating a pattern of test signals which are superimposed on the data signals from the sensors by the adding-and-amplifying units 16, the resulting signals being supplied by the multiplexer 20 to the signal analyser 30. Thus each signal analyser 30 receives an independently generated sequence of test signals and data signals relating to the same set of physical parameters.

Each signal analyser 30 stores a memory of the current values of each of the physical parameters, and this information is supplied serially by the data link 42 to the respective test signal generator 32. On receiving each signal from the respective multiplexer 20, each signal analyser 30 is programmed to carry out the following operations:

1. calculate the value of the corresponding parameter;

2. determine whether the value lies within predetermined acceptable limits;

3. update the memory of the value of the parameter if the value is acceptable; and 4. give an output signal "1" if the value is acceptable and an output signal "0" if the value is unacceptable.

It will be appreciated that for some parameters, such as pressure, the signal analyser may need to utilise its memory of the values of some of the other measured parameters, such as temperature, in determining whether the value of the parameter is acceptable.

If there are no faults in hardware or software of the sub-systems 52 and if the sensors function correctly, the sequence of signals received by each signal analyser 30, and hence the pattern of output signals from all four signal analysers 30 will be identical. A change in a value of one of the physical parameters from an acceptable to an unacceptable value will produce identical changes in the pattern of output signals from the four signal analysers 30, while a fault in a sensor or in one of the sub-systems 52 will cause the pattern of output signals from the corresponding signal analyser 30 to differ from those from the other three signal analysers 30.

The vote units 54 are programmed to give an output signal the same as any signal received at three or more of their inputs, and so the sequence of signals supplied to each pattern recognition unit 40 will be unaffected by a fault in one of the sensors or in one of the sub-systems 52. The pattern recognition units 40 operate in a similar manner to that described above in relation to FIG. 1, producing an alternating output as long as the correct test pattern is received, and a non-alternating output if any change in the pattern occurs. A change in the pattern is unlikely to be due to faults in sensors or in the sub-systems 52, as faults are unlikely to affect two identical sensors or two sub-systems 52 simultaneously, and so any change in the pattern can be interpreted as signifying the deviation of the value of one of the parameters from its accepted range.

The pulse-to-d.c. converters 56 convert the alternating output of the respective pattern recognition units 40 to a direct current, and the vote unit 58 gives an output alarm signal if any two of its inputs receive no current. Thus an alarm signal is given if any two of the pattern recognition units 40 agree that the pattern has changed, signifying the value of one of the parameters being unacceptable.

It will be appreciated that the replication of the vote units 54 and pattern recognition units 40 avoids the chance of a false alarm due to a fault in one of the pattern recognition units 40 or one of the vote units 54, as three such faults must occur at once to produce a false alarm. It will also be appreciated that the degree of redundancy (four-fold in this case) of the vote units 54 and the associated pattern recognition units 40 need not be the same as the degree of redundancy of the sub-systems 52 (which is also four-fold in this case).

It will be understood that monitoring systems of the invention may be used to monitor data signals from different numbers of sensors to those aforedescribed. For example, one alternative monitoring system, for use in a chemical plant, differs from that of FIG. 1 in having a twenty-four output demultiplexer 36 and a twenty-four input multiplexer 20, data signals being provided to twenty-four adding-and-amplifying units 16 by twenty-four sensors. The system monitors values of eight parameters relating to operation of the plant, the value of each monitored parameter being calculated from signals received at three adjacent inputs of the multiplexer 20, i.e. from groups of three successive signals received by the signal analyser 30. One monitored parameter, for example, might be the volume of a rectangular container calculated from signals representing the lengths of its sides, and another monitored parameter might be the quantity of gas in a container, calculated from signals representing the gas pressure, temperature and volume.

In operation of the alternative monitoring system, for each scan of the multiplexer 20 the signal analyser 30 receives twenty-four signals from the multiplexer 20, and produces eight output signals signifying whether the monitored parameters are within acceptable limits (1) or not (0). The complete test pattern is generated in sixteen scans of the multiplexer 20, and is shown in Table 3, in which each column of digits represents the states in consecutive scans of one of the monitored parameters A, B, C, etc., as determined from the corresponding three signals a, b, c; d, e, f; g, h, j;, etc. received from the adding-and-amplifying units 16.

TABLE 3

| Scan | Monitored parameters | | | | | | | |
|---|---|---|---|---|---|---|---|---|
| No. | H | G | F | E | D | C | B | A |
| 1 | 0 | 0 | 0 | 1 | 1 | 1 | 0 | 1 |
| 2 | 0 | 0 | 1 | 1 | 1 | 0 | 1 | 0 |
| 3 | 0 | 1 | 1 | 1 | 0 | 1 | 0 | 0 |
| 4 | 1 | 1 | 1 | 0 | 1 | 0 | 0 | 0 |
| 5 | 1 | 1 | 0 | 1 | 0 | 0 | 0 | 1 |
| 6 | 1 | 0 | 1 | 0 | 0 | 0 | 1 | 1 |
| 7 | 0 | 1 | 0 | 0 | 0 | 1 | 1 | 1 |
| 8 | 1 | 0 | 0 | 0 | 1 | 1 | 1 | 0 |
| 9 | 0 | 0 | 0 | 1 | 1 | 1 | 0 | 1 |
| 10 | 1 | 0 | 0 | 0 | 1 | 1 | 1 | 0 |
| 11 | 0 | 1 | 0 | 0 | 0 | 1 | 1 | 1 |
| 12 | 1 | 0 | 1 | 0 | 0 | 0 | 1 | 1 |
| 13 | 1 | 1 | 0 | 1 | 0 | 0 | 0 | 1 |
| 14 | 1 | 1 | 1 | 0 | 1 | 0 | 0 | 0 |
| 15 | 0 | 1 | 1 | 1 | 0 | 1 | 0 | 0 |
| 16 | 0 | 0 | 1 | 1 | 1 | 0 | 1 | 0 |

The test signal generator 32 is programmed to supply test signals to be superimposed onto a different selection of data signals each scan so as to generate the test pattern of Table 3. Some of the test signals, designated plus test signals, are such as to make the monitored parameter (calculated from the corresponding combined signal and two other signals from the multiplexer 20) exceed its maximum acceptable limit, while other test signals, designated minus test signals, are such as to make the monitored parameter (calculated from the corresponding combined signal and two other signals from the multiplexer 20) be less than its minimum acceptable limit, and such that if a plus test signal is superimposed on one data signal and a minus test signal is simultaneously superimposed on another data signal within the same group of three signals, such as k, l, m, the third signal being untested, then the monitored parameter should be within its acceptable limits.

The complete sequence of test signals to generate the test pattern of Table 3 is shown in Table 4, the letters a, b, c, etc. representing the signals received by the signal analyser 30, the symbol "+" signifying the superposition of a plus test signal on the corresponding data signal, and the symbol "−" a minus test signal.

TABLE 4

| Monitored | Scan Numbers | | | | | | | | | | | | | | | |
|---|---|---|---|---|---|---|---|---|---|---|---|---|---|---|---|---|
| Parameters | 1 | 2 | 3 | 4 | 5 | 6 | 7 | 8 | 9 | 10 | 11 | 12 | 13 | 14 | 15 | 16 |
| A | a | a+ | a | a | a+ | a | a+ | a+ | a | a− | a− | a | a− | a | a | a− |

TABLE 4-continued

| Monitored Parameters | Scan Numbers | | | | | | | | | | | | | | | |
|---|---|---|---|---|---|---|---|---|---|---|---|---|---|---|---|---|
| | 1 | 2 | 3 | 4 | 5 | 6 | 7 | 8 | 9 | 10 | 11 | 12 | 13 | 14 | 15 | 16 |
| | b | b | b+ | b | b− | b+ | b | b+ | b | b− | b | b− | b+ | b | b− | b |
| | c | c | c | c+ | c | c− | c− | c+ | c | c− | c+ | c+ | c | c− | c | c |
| B | d+ | d | d+ | d | d | d+ | d | d+ | d− | d− | d | d− | d | d | d− | d |
| | e+ | e | e | e+ | e | e− | e+ | e | e− | e | e− | e+ | e | e− | e | e |
| | f+ | f | f | f | f+ | f | f− | f− | f− | f+ | f+ | f | f− | f | f | f |
| C | g+ | g+ | g | g+ | g | g | g+ | g | g− | g | g− | g | g | g− | g | g− |
| | h | h+ | h | h | h+ | h | h− | h+ | h | h− | h+ | h | h− | h | h | h− |
| | j− | j+ | j | j | j | j+ | j | j− | j+ | j+ | j | j− | j | j | j | j− |
| D | k | k+ | k+ | k | k+ | k | k | k+ | k | k− | k | k | k− | k | k− | k− |
| | l+ | l | l+ | l | l | l+ | l | l− | l− | l+ | l | l− | l | l | l− | l |
| | m− | m− | m+ | m | m | m | m+ | m | m+ | m | m− | m | m | m | m− | m+ |
| E | n+ | n | n+ | n+ | n | n+ | n | n | n− | n | n | n− | n | n | n− | n |
| | p− | p+ | p | p+ | p | p | p+ | p | p+ | p | p− | p | p | p− | p | p− |
| | q | q− | q− | q+ | q | q | q | q+ | q | q− | q | q | q− | q+ | q+ | q+ |
| F | r | r+ | r | r+ | r+ | r | r+ | r | r | r | r− | r | r− | r− | r | r− |
| | s | s− | s+ | s | s+ | s | s | s+ | s | s− | s | s | s− | s | s− | s+ |
| | t+ | t | t− | t− | t+ | t | t | t | t− | t | t | t | t− | t+ | t+ | t |
| G | u | u | u+ | u | u+ | u+ | u | u+ | u | u− | u | u− | u− | u | u− | u |
| | v+ | v | v− | v+ | v | v+ | v | v | v− | v | v | v− | v | v− | v+ | v |
| | w | w+ | w | w− | w− | w+ | w | w | w | w | w− | w+ | w+ | w | w− |
| H | x+ | x | x | x+ | x | x+ | x+ | x | x− | x | x− | x− | x | x− | x | x |
| | y | y+ | y | y− | y+ | y | y+ | y | y | y | y− | y | y− | y+ | y | y− |
| | z | z | z+ | z | z− | z− | z+ | z | z | z | z− | z+ | z+ | z | z− | z |

It will be observed that within each group of three signals every possible combination of single plus and minus test signals is applied once, combinations involving two simultaneous plus test signals or two simultaneous minus test signals are not applied, three simultaneous plus signals or minus signals are each applied once, and on two occasions no test signals are applied to any of the signals in the group. The signal analyser 30 in this case is programmed to determine the average value over the previous sixteen scans of each signal a, b, c, d, etc., and these average values are the values supplied to the test signal generator 32 by the data link 42. In other respects this monitoring system operates in a similar manner to that described with reference to FIG. 1. The reference pattern against which the sequence of digits from the signal analyser 30 are compared is generated by starting with the eight digits in the first row of Table 3, and moving sequentially, one place at a time, eight places to the left and then eight places to the right. It will be understood that this monitoring system may be provided with redundancy in the same way as described above with reference to FIG. 3.

The test pattern may take a variety of forms as long as it is recognisable by the pattern recognition unit 40 independently of the test signal generating system 22, and an alternative test pattern could be in the form of a pseudo-random binary sequence.

Although the invention has been described in relation to the monitoring of parameters of a reactor or a chemical plant, it may be used to monitor other plant or apparatus.

The test patterns described above and shown in Tables 2 and 3 have used a sequence of eight binary digits, but it will be appreciated that the use of eight digits is not essential, being chosen for convenience in programming the computers.

I claim:

1. A system for monitoring a plurality of data signals from a plant or apparatus, each data signal representing a parameter of the plant or apparatus, the system comprising, means for periodically examining the data signals and for providing output signals representing whether each data signal represents an acceptable or an unacceptable state of the respective parameter, and means for supplying test signals to be superimposed on selected said data signals before each periodic examination thereof such as to produce corresponding combined signals equivalent to data signals representing the unacceptable state, the selection of the data signals on which the test signals are superimposed being changed for each periodic examination of the data signals within a predetermined sequence so that the examining means produces a recognisable pattern of said output signals.

2. A monitoring system as claimed in claim 1 wherein each output signal represents whether a monitored variable determined from the values of a number of the data signals lies within acceptable limits or not, the number being at least two.

3. A monitoring system as claimed in claim 2 wherein the selection of data signals is such that, for at least one periodic examination, test signals are superimposed on two of the said number of the data signals and are such that the monitored variable should lie within the acceptable limits.

4. A monitoring system as claimed in claim 2 further comprising memory means for storing the values of the data signals, and wherein the test signal supply means includes a signal generating means arranged to generate the test signals in relation to the stored values of the data signals.

5. A monitoring system as claimed in claim 1 further comprising memory means for storing the values of the data signals, and wherein the test signal supply means includes a signal generating means arranged to generate the test signals in relation to the stored values of the data signals.

6. A monitoring system as claimed in claim 1 wherein, after an integral number of the periodic examinations of the data signals, the pattern is repeated.

7. A monitoring system as claimed in claim 6 arranged such that at least one test signal is superimposed on each data signal during the said number of the periodic examinations of the data signals.

8. A monitoring system as claimed in claim 6 wherein the test signals superimposed on any one of the data signals during the said number of the periodic examinations, are such that the mean value of the corresponding combined signals is equivalent to the value of the said one data signal.

9. A monitoring system as claimed in claim 1 wherein the selection of data signals on which the test signals are superimposed is such as to cause a pattern of output signals, represented as a series of digits, which is of a form which can be generated from a sequence of n digits, successive groups of n digits being generated by sequentially shifting one place at a time n places to the right and then n places to the left and at each shift moving the digit at the end toward which the shift occurs to the other end of the group.

10. A monitoring system as claimed in claim 1, further comprising a pattern recognition means arranged to receive the said output signals and to compare the pattern with a reference pattern.

11. Apparatus for monitoring a plurality of parameters of a plant or apparatus comprising, a number of monitoring systems as claimed in claim 1, each parameter being represented by as many data signals as there are monitoring systems and each data signal being monitored by a respective monitoring system, a voting means arranged to receive the output signals from each monitoring system and to produce a signal representing the majority value of the output signals received, and a pattern recognition means arranged to receive the signals from the voting means and to compare the pattern of the received signals with a reference pattern, and to provide a signal indicating whether the patterns are the same.

12. An apparatus as claimed in claim 11 comprising a plurality of voting means, each voting means being arranged to receive the output signals from each monitoring system; a plurality of pattern recognition means, each arranged to receive the signals from a respective voting means; and a final voting means arranged to receive the signals from all the pattern recognition means.

13. A method of monitoring a plurality of data signals from a plant or apparatus, each data signal representing a parameter of the plant or apparatus, the method comprising periodically examining each data signal and providing an output signal representing whether the data signal represents an acceptable or an unacceptable state of the respective parameter, and superimposing test signals on selected said data signals before each periodic examination thereof such as to produce corresponding combined signals equivalent to data signals representing the unacceptable state, the selection of the data signals on which the test signals are superimposed being changed within a predetermined sequence so that a recognisable pattern of the output signals is produced.

* * * * *